Patented Mar. 9, 1954

2,671,768

UNITED STATES PATENT OFFICE 2,671,768

SOLUTIONS OF ACRYLONITRILE POLYMERS IN MIXTURES OF AQUEOUS NITRIC ACID AND NITROMETHANE

Paul Halbig, Fribourg, Switzerland

No Drawing. Application June 19, 1952,
Serial No. 294,482

9 Claims. (Cl. 260—29.6)

This invention relates to polymerized acrylonitrile and vinylcyanide and more especially to solutions of polymers of acrylonitrile or of vinylcyanide $(CH_2=CHCN)_x$ and copolymers and interpolymers of acrylonitrile at least 85 percent by weight of which have formed from acrylonitrile.

A great number of solvents for polyacrylonitrile and copolymers and interpolymers of acrylonitrile with other polymerized substances, for instance vinyl or acryl compounds, in which at least 85 percent of the polymers consist of acrylonitrile, are known, amongst them dimethyl formamide, lactames, lactones, dialkylcyanides, oxyacid nitriles and mixtures of nitromethane and water. The preparation of solutions with the aid of any of these solvents requires heating which causes changes of color of the solutions as well as of the products made from them such as films, yarns, threads, fibers, bristles, etc. On cooling down to room temperature these solutions as a rule solidify, forming gels, and therefore they can only be worked up at an elevated temperature which is very awkward.

I have now found that mixtures of nitric acid and nitromethane dissolve polyacrylonitrile at ordinary temperature. The solutions thus formed are colorless and remain so for several days at room temperature. The polyacrylonitrile can be recovered without any change from these solutions even after a considerable period of time. The solutions are therefore well adapted for the manufacture of films and fibers according to well known wet and dry processes. Solutions of this kind can be spun into hot gases or into cold water.

The 68 percent (non-fuming) nitric acid used widely in the laboratory can be used, and nitric acids ranging from 55 to 75 percent $HNO_3$ are suitable.

Dilute nitric acid containing about 44–55 percent may also be used. In that case, in order to facilitate solution, the mixture may be heated.

The ratio of nitric acid to nitromethane can be varied within wide limits because polyacrylonitrile is soluble in nitric acid without an addition of nitromethane which however improves and facilitates the working up of the solution, because filtering, removal of gases and the pouring are facilitated. More especially the spinning capacity is greatly improved and the solutions can be spun at room temperature.

A particular advantage offered by this invention results from the fact that the nitromethane becomes a solvent for polyacrylonitrile only when mixed with nitric acid. Therefore the polyacrylonitrile in the form of a fine powder can first be moistened uniformly with nitromethane and the moist mass can then be converted easily at a temperature of 10–20° C. into a solution by adding nitric acid. The solvent mixture may contain from 15 to 95 percent by weight of nitric acid and from 5 to 85 percent nitromethane.

If a solution shall be worked up according to the dry process, a high percentage of nitromethane, and if worked up according to the wet process, a high percentage of nitric acid should be used.

In practicing this invention, I may for instance proceed as follows:

Example 1

10 parts by weight of polyacrylonitrile in the form of a fine powder and having a mean molecular weight of 120,000 (according to Staudinger) were added at room temperature under stirring to 45 parts nitromethane until a homogenous pap has formed. 28 parts nitric acid of 68% were then added under stirring and the pap is then converted into a limpid colorless, highly viscous solution which readily lends itself to the drawing of fine threads.

Example 2

10 parts of a copolymer formed of 90 parts acrylonitrile and 10 parts vinyl acetate having a mean molecular weight of 220,000 were mixed at 20° under stirring with 90 parts nitromethane. To the suspension thus formed were added 56 parts of nitric acid of 58% and the suspension was then heated to 30–40° C. The highly viscous solution thus obtained could be formed into films or be drawn out and spun to form threads.

Example 3

10 parts of a copolymer formed of 92 parts acrylonitrile, 2 parts maleic acid and 5 parts vinyl acetate and having a mean molecular weight of 102,000 were treated with 56 parts nitromethane and 28 parts of a nitric acid of 58%, as described with reference to Example 1. The limpid solution thus obtained was adapted for the manufacture of films and threads.

Example 4

10 parts polyacrylonitrile with a mean molecular weight of 70,000 were dissolved in 46 parts nitromethane and 28 parts of a nitric acid of 58% as described with reference to Example 1. The limpid solution was adapted for spinning after having been left standing several days at 20° C.

Example 5

10 parts polyacrylonitrile having a mean molecular weight of 26,000 were mixed at 20° C. with 20 parts nitromethane and 14 parts of nitric acid of 55% after the manner described in Example 1. After a short period of time there formed a limpid stable solution which could be worked up in the usual manner at room temperature to form films and threads.

Various changes may be made in the sequence of steps and the proportions and temperatures disclosed in the foregoing specification without departing from the invention or sacrificing the advantages thereof.

I claim:

1. As a new composition of matter, the solution of a polymer of acrylonitrile, containing in the polymer molecule at least 85% by weight of acrylonitrile in a solvent which consists of a mixture of aqueous nitric acid containing 55–75% $HNO_3$ and nitromethane, the ratio of aqueous nitric acid and nitromethane in the mixture being 15–95% aqueous acid and 85–5% nitromethane.

2. The composition of matter of claim 1, in which the polymer of acrylonitrile is polyacrylonitrile.

3. As a new composition of matter, a highly viscous liquid particularly adapted to be spun, consisting of a solution of polyacrylonitrile possessing a mean molecular weight ranging between 20,000 and 220,000, in a solvent which consists of a mixture of nitromethane and aqueous nitric acid in a proportion such that the ratio of aqueous nitric acid and nitromethane is 15–95% aqueous acid and 85–5% nitromethane.

4. The process of producing the composition of matter of claim 1 which comprises mixing the polymer of acrylonitrile with nitromethane and adding to this mixture an aqueous nitric acid containing 55–75% $HNO_3$ in a proportion such that in the solution the ratio of aqueous nitric acid and nitromethane is 15–95% aqueous acid and 85–5% nitromethane 5. The process of claim 4, in which the polymer of acrylonitrile is polyacrylonitrile.

6. The process of claim 1, in which the polymer of acrylonitrile to be dissolved has the form of a fine powder.

7. The process of claim 4, in which the constituents of the solution are mixed at a temperature below 80° C.

8. The process of claim 4, in which the constituents of the solution are mixed at room temperature.

9. The process of claim 4, in which the polymer of acrylonitrile is mixed with the nitromethane an dthe nitric acid is then added to this mixture.

PAUL HALBIG.

References Cited in the file of this patent

UNITED STATES PATENTS

| Number | Name | Date |
|---|---|---|
| 2,579,451 | Polson | Dec. 18, 1951 |